United States Patent
Moriyama

(10) Patent No.: US 10,298,018 B2
(45) Date of Patent: May 21, 2019

(54) POWER CONTROL APPARATUS, POWER CONTROL SYSTEM, AND POWER CONTROL METHOD

(71) Applicant: KYOCERA Corporation, Kyoto-shi, Kyoto (JP)

(72) Inventor: Yuichi Moriyama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 141 days.

(21) Appl. No.: 15/546,444

(22) PCT Filed: Jan. 28, 2016

(86) PCT No.: PCT/JP2016/000448
§ 371 (c)(1),
(2) Date: Jul. 26, 2017

(87) PCT Pub. No.: WO2016/121402
PCT Pub. Date: Aug. 4, 2016

(65) Prior Publication Data
US 2018/0026450 A1 Jan. 25, 2018

(30) Foreign Application Priority Data

Jan. 28, 2015 (JP) .................................. 2015-014795

(51) Int. Cl.
*H02J 3/38* (2006.01)
*G05F 1/67* (2006.01)
(Continued)

(52) U.S. Cl.
CPC ................ *H02J 3/385* (2013.01); *G05F 1/67* (2013.01); *H02H 7/1213* (2013.01); *H02J 1/102* (2013.01);
(Continued)

(58) Field of Classification Search
CPC ...... H02J 7/35; H02J 3/32; H02J 3/383; H02J 1/102; H02J 2003/388; H02J 3/38;
(Continued)

(56) References Cited

U.S. PATENT DOCUMENTS

| 9,831,827 B2 * | 11/2017 | Kono | ................ H01L 31/02021 |
| 2007/0103108 A1 * | 5/2007 | Capp | ........................ H02J 7/35 320/101 |

(Continued)

FOREIGN PATENT DOCUMENTS

| JP | H08-251818 A | 9/1996 |
| JP | 2005-65466 A | 3/2005 |

(Continued)

OTHER PUBLICATIONS

International Search Report dated Apr. 26, 2016, issued by Japan Patent Office for International Application No. PCT/JP2016/000448.

(Continued)

*Primary Examiner* — Adam D Houston
(74) *Attorney, Agent, or Firm* — Procopio Cory Hargreaves and Savitch LLP

(57) ABSTRACT

A power control apparatus includes a plurality of transformers configured to transform power generated by a plurality of solar cell strings, and a controller configured to control the transformers. The transformers each include a diode configured to prevent a reverse flow of power to be output from the transformer itself and a switch configured to open or close a connection between the solar cell string and an inverter. When a diode of one of the transformers has failed to prevent the reverse flow of the power to be output from the one of the transformers, the controller first opens the (Continued)

switches of all of the transformers and then closes the switches of the transformers other than the switch of the one of the transformers.

12 Claims, 10 Drawing Sheets

(51) Int. Cl.
*H02S 40/36* (2014.01)
*H02J 1/10* (2006.01)
*H02M 3/157* (2006.01)
*H02M 3/158* (2006.01)
*H02M 1/32* (2007.01)
*H02H 7/12* (2006.01)
*H02J 3/00* (2006.01)
*H02M 1/00* (2006.01)

(52) U.S. Cl.
CPC ............ *H02M 1/32* (2013.01); *H02M 3/157* (2013.01); *H02M 3/1584* (2013.01); *H02S 40/36* (2014.12); *H02J 2003/001* (2013.01); *H02M 1/00* (2013.01); *H02M 2001/0083* (2013.01); *H02M 2001/325* (2013.01); *Y02E 10/58* (2013.01)

(58) Field of Classification Search
CPC .... H02J 3/381; H02J 3/387; H02J 3/46; H02J 7/0068; H02J 7/34; H02J 1/00; H02J 1/108; H02J 2003/001; H02J 2007/0067; H02J 3/06; H02J 3/385; H02J 3/386; H02J 3/40; H02J 7/0018; H02J 7/0019; H02J 7/0063; H02J 7/0065; H02J 7/007; H02J 7/008; H02J 7/345; H02J 9/06; H02J 9/061; Y02E 10/563; Y02E 70/30; Y02E 10/50; Y02E 10/566; Y02E 10/58; Y02E 10/763; Y02E 10/766; Y02E 60/122; Y02P 90/50
See application file for complete search history.

(56) References Cited

U.S. PATENT DOCUMENTS

| | | | | |
|---|---|---|---|---|
| 2008/0143188 | A1* | 6/2008 | Adest | H02J 1/102 307/82 |
| 2008/0236648 | A1* | 10/2008 | Klein | H01L 31/02021 136/244 |
| 2011/0273015 | A1* | 11/2011 | Adest | H01L 31/02021 307/43 |
| 2012/0013182 | A1 | 1/2012 | Minegishi et al. | |
| 2012/0091800 | A1* | 4/2012 | Shenoy | H01L 31/02021 307/24 |
| 2012/0235497 | A1* | 9/2012 | Sakai | H02J 3/32 307/80 |
| 2012/0239214 | A1* | 9/2012 | Nakashima | H02J 3/32 700/291 |
| 2012/0253537 | A1* | 10/2012 | Okuda | H02J 3/32 700/296 |
| 2012/0299383 | A1* | 11/2012 | Cyuzawa | H02J 3/381 307/75 |
| 2012/0300347 | A1* | 11/2012 | Fahrenbruch | H01L 31/02021 361/1 |
| 2013/0015819 | A1* | 1/2013 | Nakashima | H02J 7/0019 320/126 |
| 2013/0033108 | A1* | 2/2013 | Hidaka | H02J 1/108 307/51 |
| 2013/0181531 | A1* | 7/2013 | Deboy | H02J 3/385 307/82 |
| 2014/0042815 | A1* | 2/2014 | Maksimovic | H02J 1/00 307/63 |
| 2014/0306542 | A1* | 10/2014 | Williams | H02J 3/385 307/80 |
| 2014/0319916 | A1* | 10/2014 | Cummings | H02J 1/102 307/53 |
| 2015/0092464 | A1* | 4/2015 | Uehira | H02J 3/381 363/95 |
| 2015/0188487 | A1* | 7/2015 | Yoshidomi | H02S 50/10 324/761.01 |
| 2015/0236589 | A1 | 8/2015 | Baba | |
| 2015/0380967 | A1* | 12/2015 | Toya | H01M 10/44 320/128 |
| 2016/0072292 | A1* | 3/2016 | Rogers | H02J 3/46 307/62 |
| 2016/0187905 | A1* | 6/2016 | Nakamoto | G05F 1/56 323/280 |
| 2016/0204293 | A1* | 7/2016 | Nakai | H02S 40/36 320/101 |
| 2016/0209853 | A1* | 7/2016 | Deboy | H02M 1/083 |
| 2016/0226255 | A1* | 8/2016 | Sugeno | H02J 7/35 |
| 2016/0268806 | A1* | 9/2016 | Chatterjee | H02M 3/1584 |
| 2016/0344192 | A1* | 11/2016 | Eizips | H02J 3/385 |
| 2016/0372926 | A1* | 12/2016 | Pahlevaninezhad | H02J 3/382 |
| 2017/0170675 | A1* | 6/2017 | Ni Scanaill | H02J 7/0068 |
| 2017/0192442 | A1* | 7/2017 | Hieke | G05B 15/02 |
| 2017/0250535 | A1* | 8/2017 | Nishigai | H02J 7/35 |
| 2017/0264197 | A1* | 9/2017 | Kubouchi | H02M 3/158 |
| 2017/0279279 | A1* | 9/2017 | Shimada | H02J 3/385 |
| 2018/0006579 | A1* | 1/2018 | Matsuoka | H02J 3/38 |
| 2018/0006601 | A1* | 1/2018 | Dent | H02S 40/34 |
| 2018/0026450 | A1* | 1/2018 | Moriyama | G05F 1/67 307/51 |
| 2018/0041042 | A1* | 2/2018 | Maki | G05F 1/67 |
| 2018/0097452 | A1* | 4/2018 | Chapman | H02S 40/32 |
| 2018/0251034 | A1* | 9/2018 | Lee | H02J 3/385 |
| 2018/0269685 | A1* | 9/2018 | Sugeno | H02S 20/30 |
| 2018/0278173 | A1* | 9/2018 | Guillaume | H02M 3/155 |
| 2018/0287484 | A1* | 10/2018 | Braginsky | H02M 7/44 |
| 2018/0295535 | A1* | 10/2018 | Kavars | H04L 67/12 |
| 2018/0337533 | A1* | 11/2018 | Nakayama | H02J 3/38 |
| 2018/0351354 | A1* | 12/2018 | Galin | H02J 1/102 |
| 2018/0351401 | A1* | 12/2018 | Binder | H02J 3/381 |
| 2018/0366945 | A1* | 12/2018 | Braginsky | H02H 7/20 |
| 2018/0375469 | A1* | 12/2018 | Chung | G01R 19/0092 |

FOREIGN PATENT DOCUMENTS

| | | |
|---|---|---|
| JP | 2005-151664 A | 6/2005 |
| JP | 2014-63282 A | 4/2014 |
| WO | 2014/045563 A1 | 3/2014 |
| WO | 2014/033868 A1 | 6/2014 |

OTHER PUBLICATIONS

Written Opinion of the International Searching Authority dated Apr. 26, 2016, issued by Japan Patent Office for International Application No. PCT/JP2016/000448.

* cited by examiner

POWER CONTROL APPARATUS, POWER CONTROL SYSTEM, AND POWER CONTROL METHOD

CROSS REFERENCE TO RELATED APPLICATION

This application claims priority to and the benefit of Japanese Patent Application No. 2015-14795 filed on Jan. 28, 2015, the entire contents of which are incorporated herein by reference.

TECHNICAL FIELD

This disclosure relates to a power control apparatus, a power control system, and a power control method.

BACKGROUND

In recent years, there has been known power control apparatuses such as power conditioners (inverters) that connect a plurality of solar cell strings together and control power generated by the plurality of solar cell strings. The power conditioners which have conventionally and popularly been used are of a single-type (or a centralized-type) that aggregate wiring of a plurality of solar cell strings in a connection box and control power output from the connection box. However, power conditioners employing a multistring scheme that allows direct connection of a plurality of solar cell strings together have recently been more popularly used.

The power conditioners employing the multistring scheme includes DC/DC converters having a maximum power point tracking (MPPT) function. Such a DC/DC converter, while adjusting respective voltages of the solar cell strings, controls respective operation points for producing maximum power. In this way, the power conditioner employing the multistring scheme may maximize respective power generation amounts of the respective solar cell strings.

CITATION LIST

Patent Literature

PLT 1: JP-A-08-251818

SUMMARY

Solution to Problem

In a first aspect of the disclosure, a power control apparatus includes:
 a plurality of transformers each configured to transform power generated by a corresponding one of a plurality of solar cell strings and outputting power transformed to an inverter; and
 a controller configured to control the plurality of transformers,
 wherein the plurality of transformers each include a diode configured to prevent a reverse flow of power to be output from a corresponding one of the plurality of transformers, and a switch configured to open or close a connection between the solar cell string and the inverter, and
 wherein, when a diode of one of the plurality of transformers fails to prevent the reverse flow of the power to be output from the one of the plurality of transformers, the controller opens the switches of all of the plurality of transformers and then closes switches other than the switch of the one of the plurality of transformers.

In a second aspect of the disclosure, a power control system including a plurality of solar cell strings and a power control apparatus,
 wherein the power control apparatus includes:
  a plurality of transformers each configured to transform power generated by a corresponding one of a plurality of solar cell strings and outputting power transformed to an inverter, and
  a controller configured to control the plurality of transformers, wherein the plurality of transformers each include:
   a diode configured to prevent a reverse flow of power to be output from a corresponding one of the plurality of transformers, and
   a switch configured to open or close a connection between the solar cell string and the inverter, and
  wherein, when a diode of one of the plurality of transformers fails to prevent the reverse flow of the power to be output from the one of the plurality of transformers, the controller opens the switches of all of the plurality of transformers and then closes switches other than the switch of the one of the plurality of transformers.

In a third aspect of the disclosure, a power control method of a power control apparatus having a plurality of transformers each configured to transform power generated by a corresponding one of a plurality of solar cell strings and outputting power transformed to an inverter,
 wherein the plurality of transformers each include a diode configured to prevent a reverse flow of power to be output from a corresponding one of the plurality of transformers, and a switch configured to open or close a connection between the solar cell string and the inverter, and
 wherein the power control method includes:
  a determination step of determining whether a diode of one of the plurality of transformers has failed to prevent a reverse flow of power to be output from the one of the plurality of transformers;
  an opening step of, when in the determination step the diode is determined as having failed to prevent the reverse flow of the power to be output from the one of the plurality of transformers, opening the switches of all of the plurality of transformers; and
  a closing step of closing switches other than the switch of the one of the plurality of transformers.

DETAILED DESCRIPTION

Figure 1:
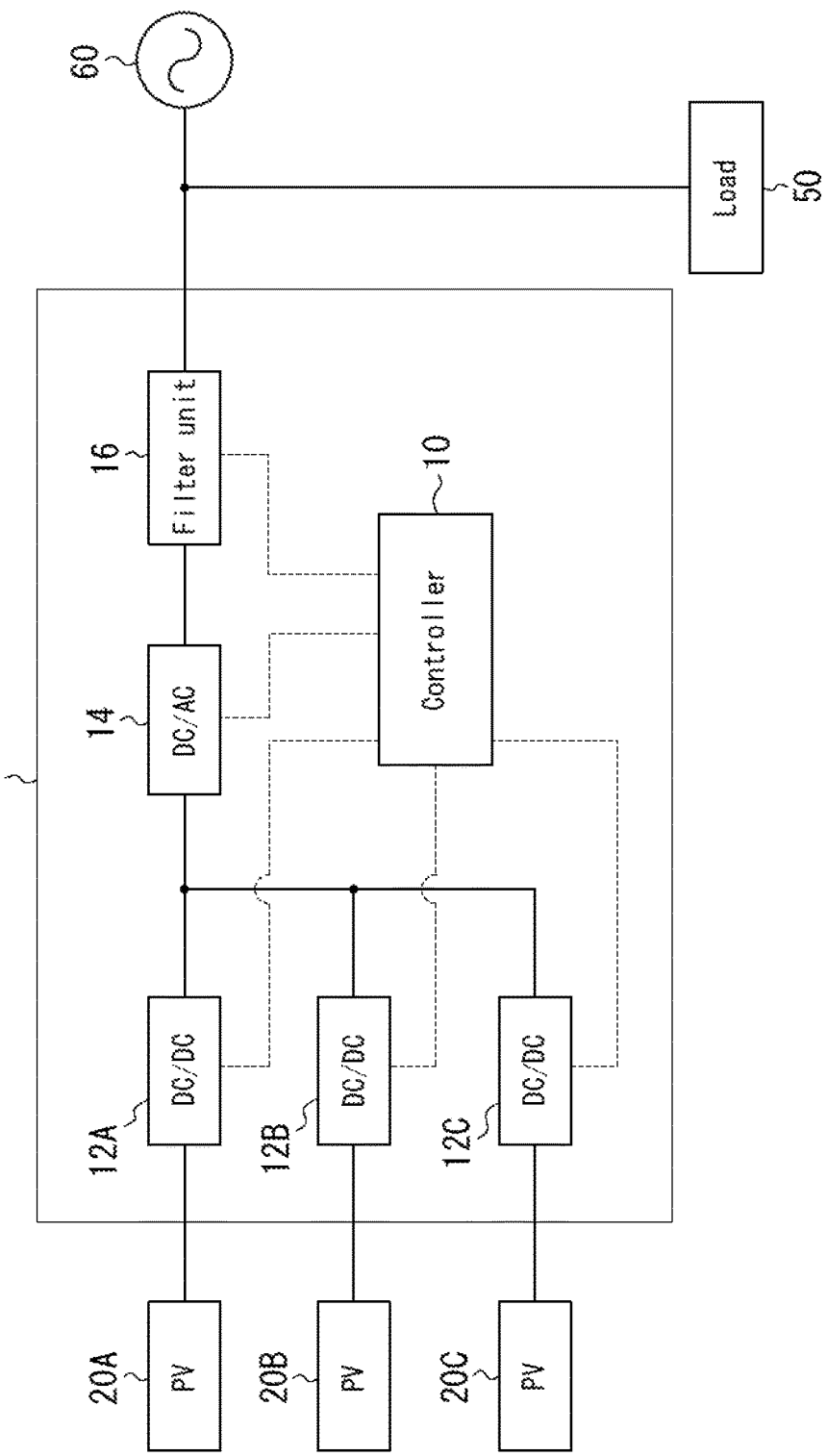
FIG. 1 is a functional block diagram illustrating a power control system according to one embodiment.

FIG. 1 is a functional block diagram schematically illustrating a power control system according to one embodiment. In FIG. 1, solid lines mainly represent paths of power, and broken lines mainly represent paths of control signals or communication signals of various information. Hereinafter, descriptions of conventionally well-known elements and functional units will be appropriately simplified or omitted.

As illustrated in FIG. 1, a power control system 1 of the present embodiment includes a power control apparatus 5 and a plurality of solar cell strings 20A to 20C. In an example illustrated in FIG. 1, the power control system 1 includes three solar cell strings: a solar cell string 20A, solar cell string 20B, and a solar cell string 20C. However, the power control system 1 of the present embodiment may include any number of solar cell strings 20. As such, the power control system 1 allows solar panels to be installed on respective planes of a house roof facing different directions.

In the power control system 1, all of the plurality of solar cell strings 20A to 20C are coupled to the power control apparatus 5, which in turn is coupled to a load 50 and a power grid 60.

As illustrated in FIG. 1, the power control apparatus 5 collectively interconnects the plurality of solar cell strings 20A to 20C with the power grid 60. When power control apparatus 5 collectively interconnects the plurality of solar cell strings 20 with the power grid 60, a distribution board may be provided between the power control apparatus 5 and the power grid 60 to supply power to the load 50, which may be a home appliance used by a user. However, such a distribution board is omitted in FIG. 1.

Next, the power control apparatus 5 of the present embodiment will be described.

As illustrated in FIG. 1, the power control apparatus 5 of the present embodiment includes a controller 10 and a plurality of transformers 12A to 12C. The power control apparatus 5 may also include other constituents such as an inverter 14 and a filter unit 16, as necessary.

The transformers 12A to 12C each transforms power, i.e., steps-up or steps-down voltage of power, generated by one of the solar cell strings 20A to 20C coupled thereto and outputs transformed power to the inverter 14. To that end, the transformers 12A to 12C are coupled to the solar cell strings 20A to 20C, respectively, as illustrated in FIG. 1. The transformed power output from the transformers 12A to 12C are collectively input to the inverter 14. The inverter 14 is coupled to the filter unit 16, which in turn is coupled to the load 50 and the power grid 60. As illustrated in FIG. 1, also, the controller 10 is coupled to the transformers 12A to 12C, the inverter 14, and the filter unit 16 to centrally control and manage these components.

The solar cell strings 20A to 20C each include a plurality of modules connected in series, in which a plurality of solar cells are connected in series. In the present embodiment, the solar cell converts energy of the sunlight into DC power. The solar cell includes, for example, power generation units having photoelectric conversion cells connected in a matrix and outputs predetermined DC currents (e.g., 10A). The solar cell may be any solar cell that is capable of performing photoelectric conversion and may be a silicon polycrystalline solar cell, a silicon single crystal solar cell, or a thin-film solar cell such as CIGS.

The power control apparatus 5 transforms, i.e., steps-up or steps-down the DC power generated by the solar cell strings 20A to 20C and then converts the DC power into AC power. This AC power may be supplied to the load 50, and unused portion of the AC power may be sold to the power grid 60. In the present embodiment, the power control apparatus 5 may step-up or step-down the power under the control of the controller 10. The power control apparatus 5 of the present embodiment may be configured to include functions similar to those of common power conditioners (inverters).

The transformers 12A to 12C each convert the power generated by a corresponding one of the solar cell strings 20A to 20C coupled thereto and outputs converted power to the inverter 14. The transformers 12A to 12C may be any transformers that are capable of transforming, i.e., stepping-up or stepping-down a voltage of the DC power having been input and may be, for example, DC/DC converters. The transformers 12A to 12C will be described in detail later.

The inverter 14 may be a bi-directional inverter. The inverter 14 converts the DC power generated by the solar cell strings 20A to 20C into the AC power, and also converts AC power supplied from the power grid 60 into DC power.

The filter unit 16 adjusts the power supplied from the power grid 60 to yield power in a forward flow, which is suitable for the load 50. The filter unit 16 also adjusts the power generated by the solar cell strings 20A to 20C to yield power in a reverse flow, which is suitable for power selling to the power grid 60.

The controller 10 controls and manages the entire power control apparatus 5. In the present embodiment, in particular, the controller 10 controls the transformers 12A to 12C, the inverter 14, and the filter unit 16. The controller 10 may be, for example, a microcomputer or a processor (a CPU). In the following description, the controller 10 includes a memory configured to store various programs and information. This memory also stores algorithm used for data analysis or various computing processing performed by the controller 10, as well as various reference tables such as a look-up table (LUT). Control performed by the controller 10 unique to the present embodiment will be further described later.

The power generated by the solar cell strings 20A to 20C may be supplied, via the inverter 14, to the load 50, which may be any load that consumes power. The load 50 may be an apparatus such as the home appliance that receives power supply from the power control system 1 for use by the user. Although one load 50 is illustrated in FIG. 1, any number of the loads 50 of any type may be used.

The solar cell strings 20A to 20C coupled to the inverter 14 are interconnected with the power grid 60 and output power to be supplied to the load 50. Here, the power grid 60 may be a typical commercial power system (a commercial power source/power grid).

Next, the transformer 12 of the present embodiment will be further described.

Figure 2:
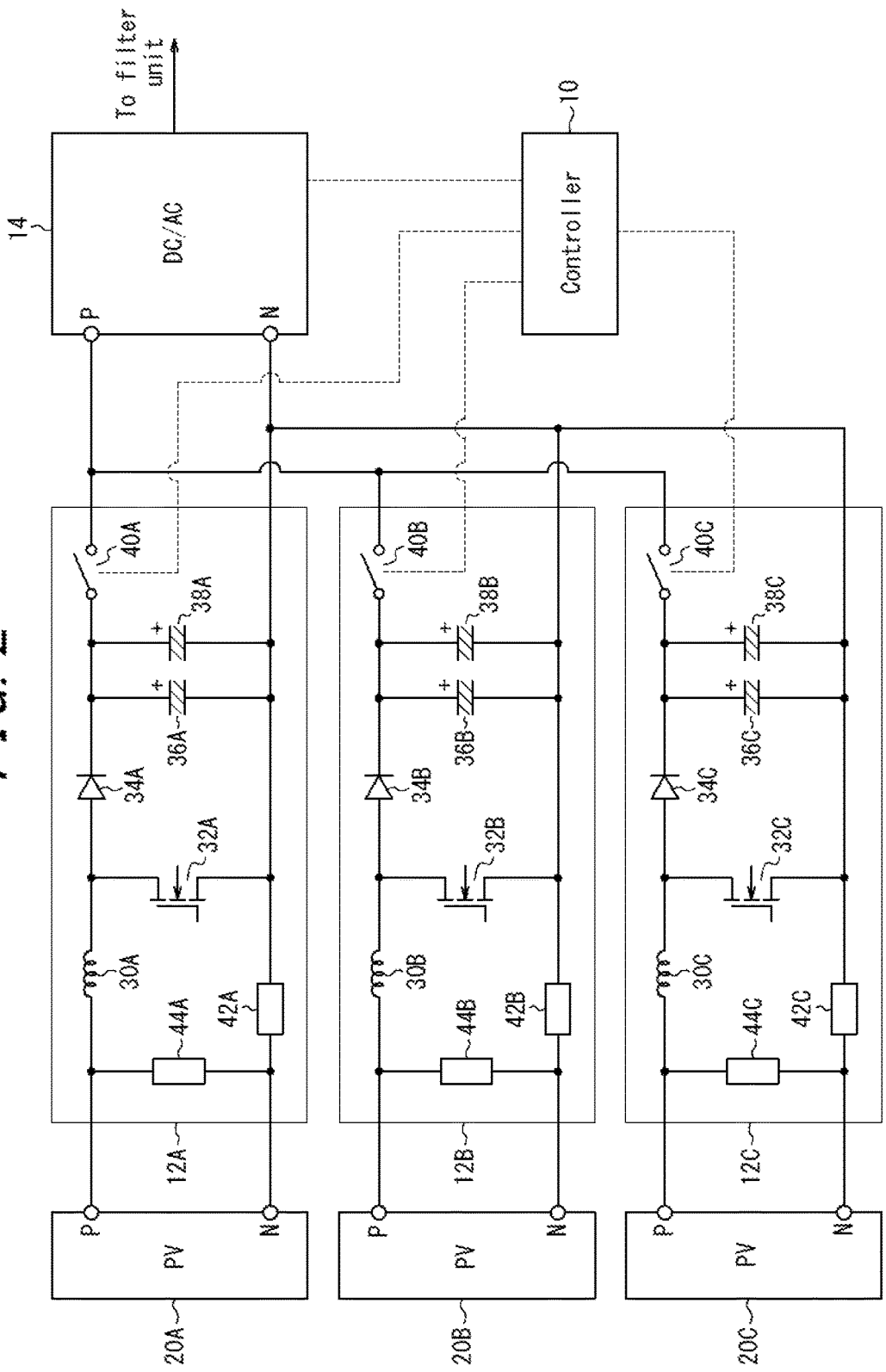
FIG. 2 is a functional block diagram illustrating a section of a power control apparatus according to one embodiment.

FIG. 2 is a functional block diagram illustrating the transformers 12A to 12C of the present embodiment in detail. Since the transformers 12A to 12C of the present embodiment may be configured similarly to one another as illustrated in FIG. 2, the transformer 12A will be described as an example in the following description.

As illustrated in FIG. 2, the transformer 12A includes a coil 30A, a switching element 32A, a diode 34A, capacitors 36A and 38A, a switch 40, a current sensor 42A, and a voltage sensor 44A.

In the present embodiment, having a configuration similar to the DC/DC converter employing a chopper method as illustrated in FIG. 2, the transformer 12A may step-up the power generated by the solar cell string 20A. The coil 30A may be any choke coil. The switching element 32A may be a semiconductor device such as a transistor and MOS FET. The coil 30A stores energy when the switching element 32A is turned on and current of the power generated by the solar cell string 20A flows to the coil 30A. Also, the coil 30A discharges stored energy when the switching element 32A is turned off.

The capacitors 36A and 38A may store voltages of power generated by the solar cell string 20A and the coil 30A. The diode 34A prevents a reverse flow of the voltage accumulated in the capacitors 36A and 38A. With the diode 34A, therefore, the power generated by the solar cell string 20A is output to the inverter 14 without flowing backward. That is, the diode 34A of the present embodiment prevents the reverse flow of the power to be output from the transformer 12A. The transformer 12A may have a configuration for stepping-up similar to that of a circuit of a common DC/DC converter. Therefore, more detailed descriptions of circuit configurations and components connection states of the transformer 12A will be omitted.

In the present embodiment, when the transformer 12A steps-up the power generated by the solar cell string 20A, the controller 10 controls switching of the switching element 32A. In FIG. 2, a control line used by the controller 10 to control the switching element 32A is omitted. The controller 10 controls time (a duty cycle) to switch on/off the switching element 32A to yield a necessary output voltage. When controlling the switching of the switching element 32A as described above, the controller 10 may employ, for example, pulse width modulation (PWM). Control performed by the transformer 12A to step-up the power generated by the solar cell string 20A may be similar to stepping-up control performed by a common DC/DC converter. Therefore, a more detailed description of the stepping-up control will be omitted.

The switch 40A is provided between connection points, which are respectively connecting the diode 34A and the capacitor 36A together and the diode 34A and the capacitor 38A together, and the inverter 14. The switch 40 may open or close a connection of the diode 34A and the capacitors 36A and 38A to the inverter 14. In the present embodiment, that is, the switch 40 may open or close a connection between the solar cell string 20 and the inverter 14, i.e., connect/disconnect the solar cell string 20 to/from the inverter 14. The switch 40A may be a switch such as any power relay. The switch 40A may open or close the connection under the control of the controller 10. To that end, the controller 40A is coupled to the controller 10 via a control line.

The current sensor 42A detects a current value of the power generated by the solar cell string 20A coupled to the transformer 12A. The voltage sensor 44A detects a voltage value of the power generated by the solar cell string 20A coupled to the transformer 12A. To that end, the current sensor 42A and the voltage sensor 44A are provided in positions as illustrated in FIG. 2, by way of example. However, the current sensor 42A and the voltage sensor 44A may be provided in any positions that allow the measurement of the current value, or the voltage value, of the power generated by the solar cell string 20A.

Although the transformer 12A is described above as an example, the transformers 12B and 12C may have configurations similar to that of the transformer 12A. As illustrated in FIG. 2, outputs from the transformers 12B and 12C are combined with the output from the transformer 12A.

Next, the power control performed by the power control system 1 will be described.

Figure 3:
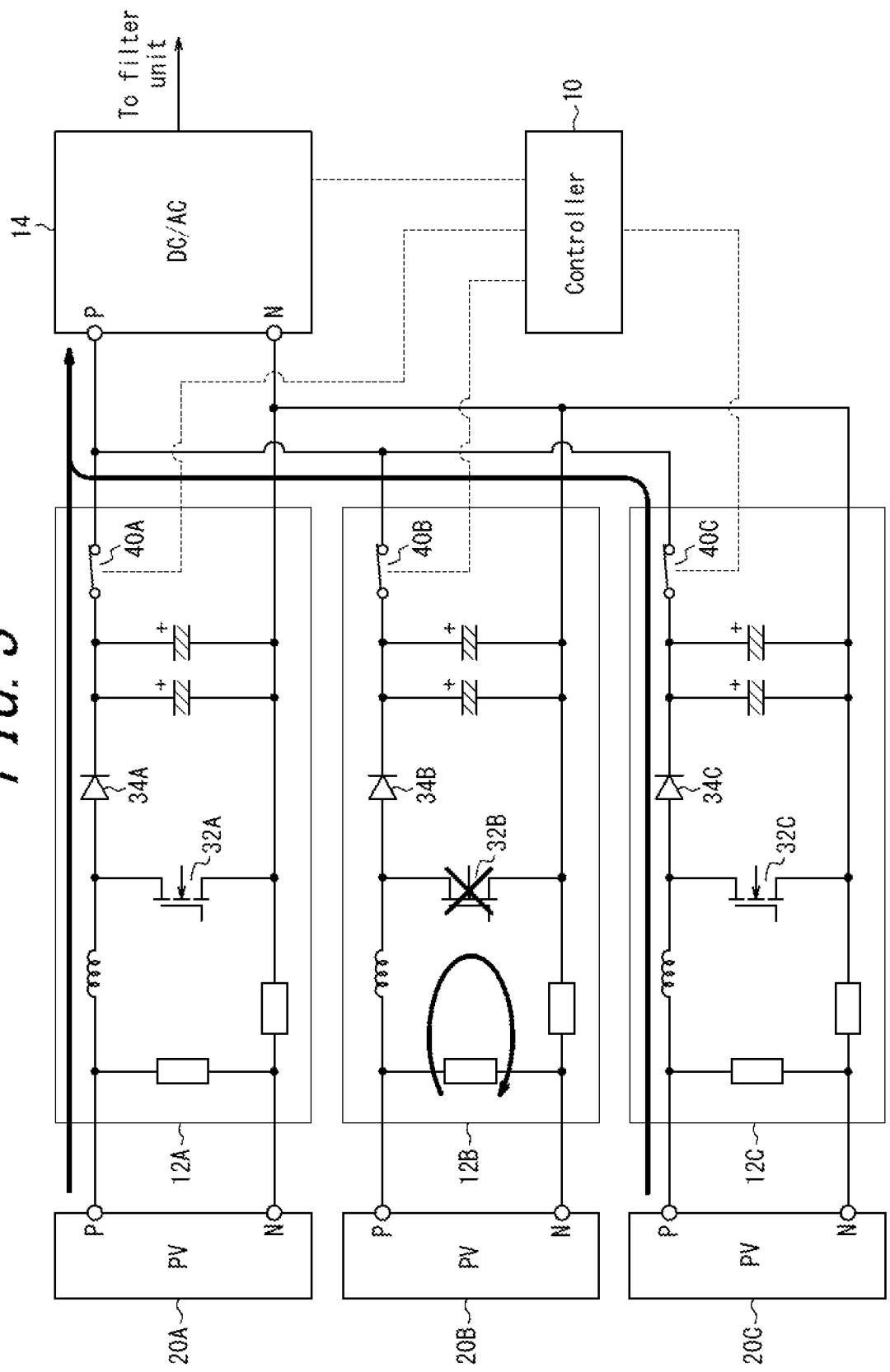
FIG. 3 is a diagram illustrating an example of power control according to one embodiment.

FIG. 3 is a diagram illustrating an example of an operation of the power control system 1.

Normally, when all components constituting the power control system 1 are appropriately functioning, the power generated by the solar cell strings 20A to 20C is transformed by a corresponding one of the transformers 12A to 12C, aggregated, and then output to the inverter 14. The power control apparatus 5 operates in accordance with maximum power points (performs an MPPT operation) to make the most of the power generated by the solar cell strings 20A to 20C.

Here, as illustrated in FIG. 3, for example, the switching element 32B of the transformer 12B is assumed to be having a trouble such as being defective. For example, when the switching element 32B is defective causing a short-circuit, a short-circuit current keeps flowing within a circuit as illustrated in FIG. 3. When the switching element 32B stops functioning appropriately, the transformer 12B becomes unable to appropriately transform the power generated by the solar cell string 20B and to output the transformed power to the inverter 14.

Figure 4A:
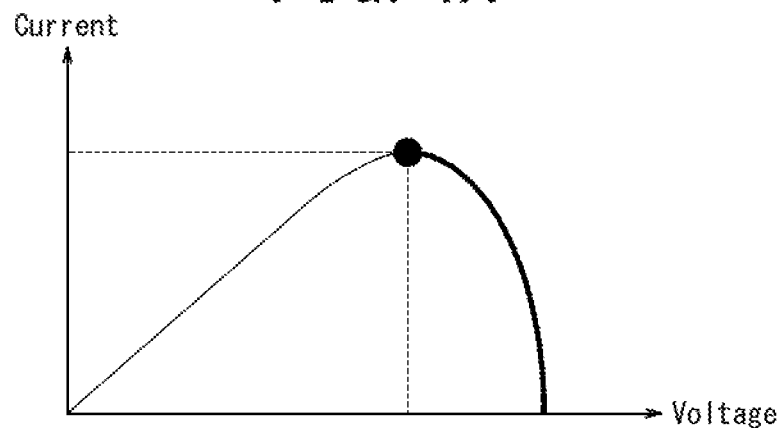
FIGS. 4A to 4C are graphs illustrating the example of the power control according to one embodiment.
Figure 4B:
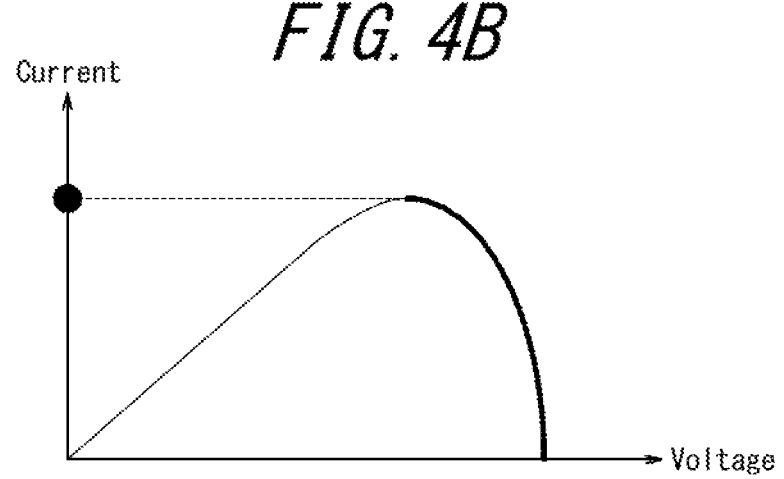
Figure 4C:
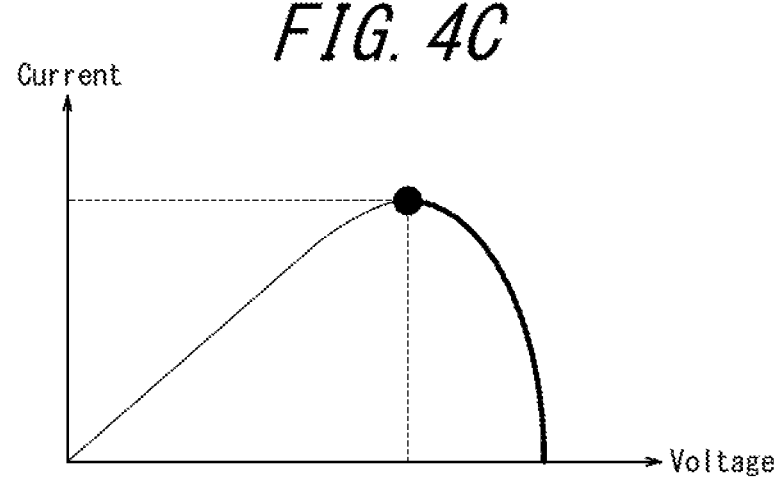

FIG. 4A is a graph illustrating the current value and the voltage value respectively detected by the current sensor 42A and the voltage sensor 44A in the transformer 12A illustrated in FIG. 3. FIG. 4B is a graph illustrating the current value and the voltage value respectively detected by the current sensor 42B and the voltage sensor 44B in the transformer 12B illustrated in FIG. 3. FIG. 4C is a graph illustrating the current value and the voltage value respectively detected by the current sensor 42C and the voltage sensor 44C in the transformer 12C illustrated in FIG. 3. FIG. 4A indicates an operation state of the solar cell string 20A detected in the transformer 12A. FIG. 4B indicates an operation state of the solar cell string 20B detected in the transformer 12B. FIG. 4C indicates an operation state of the solar cell string 20C detected in the transformer 12C.

The transformers 12A and 12C illustrated in FIG. 3 are appropriately functioning and performing in accordance with the maximum power points as illustrated in FIGS. 4A and 4C. However, the transformer 12B illustrated in FIG. 3 has failed to appropriately function and to operate in accordance with the maximum power point as illustrated in FIG. 4B. As illustrated in FIG. 4B, due to the short-circuit, the transformer 12B has zero-voltage and a maximum current flow.

Figure 5:
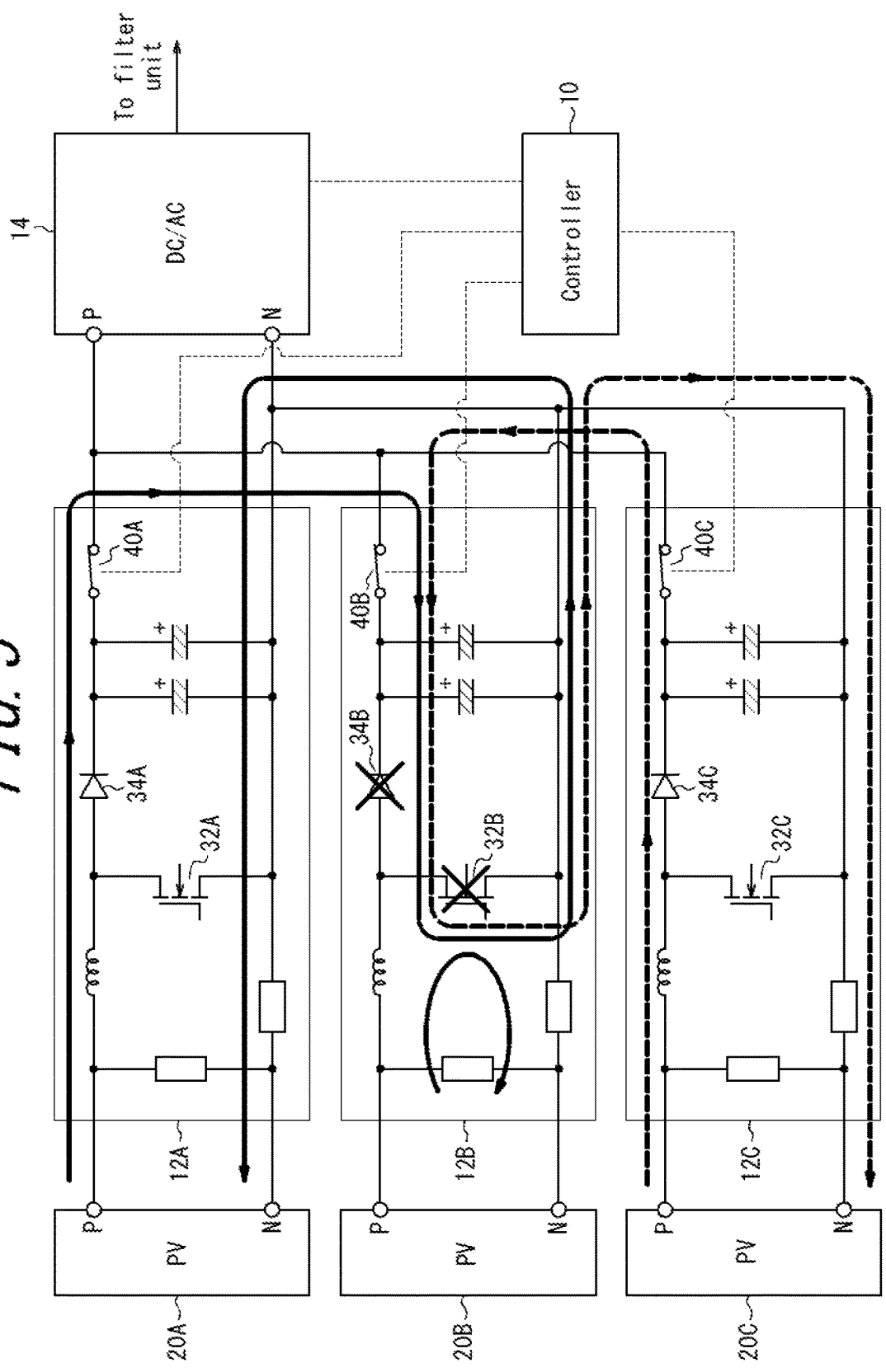
FIG. 5 is a diagram illustrating another example of the power control according to one embodiment.

FIG. 5 is a diagram illustrating an example of an operation subsequent to the operation of the power control system 1 illustrated in FIG. 3.

In FIG. 5, the switching element 32B is assumed to have failed to appropriately function and, further, the diode 34B is assumed to be having a trouble such as being defective. As described above, the diode 34B is provided for the purpose of preventing the reverse flow of the power to be output from the transformer 12B. Therefore, the diode 34B having failed to appropriately prevent the reverse flow of the power may lead to various troubles.

As illustrated in FIG. 5, when the diode 34B fails to appropriately function, the power generated by the solar cell string 20A flows backward to the transformer 12B via the transformer 12A and then returns to the transformer 12A from the transformer 12B. In FIG. 5, a bold solid line represents the power generated by the solar cell string 20A. As illustrated in FIG. 5, also, when the diode 34B fails to appropriately function, the power generated by the solar cell string 20C flows backward to the transformer 12B via the transformer 12C and then returns to the transformer 12C from the transformer 12B. In FIG. 5, a bold broken line represents the power generated by the solar cell string 20C.

As illustrated in FIG. 5, when the diode 34B fails to appropriately function as being damaged, for example, and causes the short-circuit, the power generated by the solar cell strings 20A and 20C together flow to the transformer 12B. Therefore, a large current flows to the transformer 12B, possibly causing a trouble such as generation of heat. Although in FIG. 5 the power control system 1 includes three solar cell strings, the trouble such as the generation of heat may become more serious in proportion to the number of the solar cell strings.

Figure 6A:
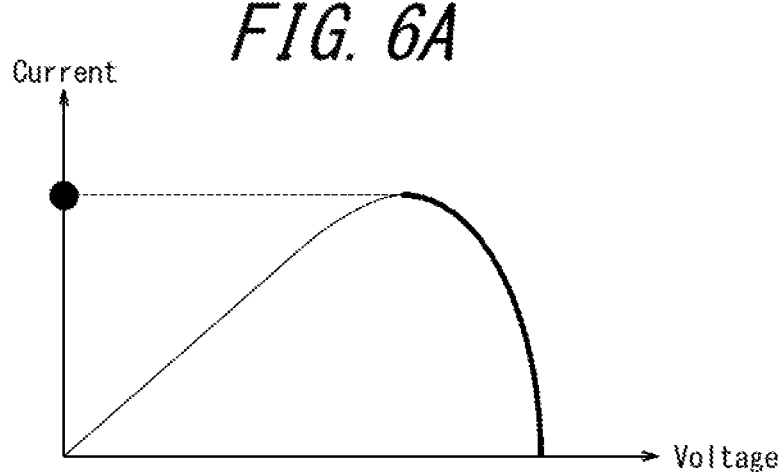
FIGS. 6A to 6C are graphs illustrating the another example of the power control according to one embodiment.
Figure 6B:
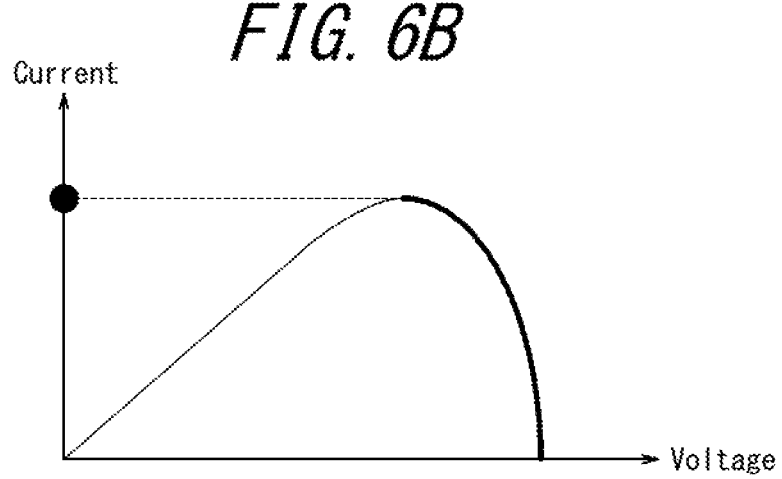
Figure 6C:
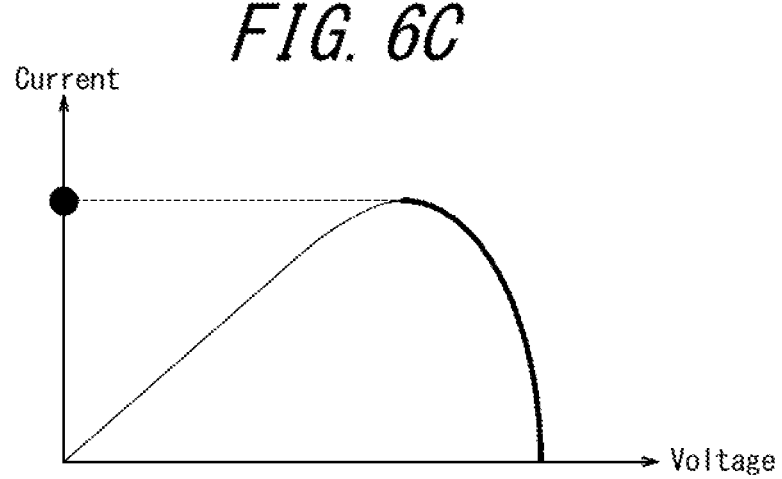

FIG. 6A is a graph illustrating the current value and the voltage value respectively detected by the current sensor 42A and the voltage sensor 44A in the transformer 12A illustrated in FIG. 5. FIG. 6B is a graph illustrating the current value and the voltage value respectively detected by the current sensor 42B and the voltage sensor 44B in the transformer 12B illustrated in FIG. 5. FIG. 6C is a graph illustrating the current value and the voltage value respectively detected by the current sensor 42C and the voltage sensor 44C in the transformer 12C illustrated in FIG. 5. Components and meanings of the graphs of FIGS. 6A to 6C are similar to those of FIGS. 4A to 4C.

As illustrated in FIGS. 6A to 6C, the diode 34B having failed to appropriately function, regardless of the transformers 12A and 12C both appropriately functioning, causes short-circuits of the power output from the transformers 12A and 12C, and thus causes the zero voltage and the maximum current flow. FIGS. 6A to 6C each indicate the zero voltage and the maximum current flow due to the short-circuit. That is, in this situation, regardless of that the transformer 12B alone has failed, the power generated by the solar cell strings 20A and 20C in addition to the power generated by the solar cell string 20B cannot be used appropriately.

In the example of the operation as described above, a situation caused by the switching element 32B having failed to appropriately function is described with reference to FIG. 3, and a situation caused by the diode 34B having failed to appropriately function is described with reference to FIG. 5. However, regardless of whether, for example, the switching element 32B is appropriately functioning, the diode 34B having failed to appropriately function causes a similar trouble. That is, when the switching element 32B is turned on, the diode 34B, if fails to appropriately function, causes the power generated by all of the solar cell strings to flow together to the transformer 12B. Consequently, the transformer 12B possibly generates heat, and the solar cell strings 20A and 20C appropriately functioning may be compelled to stop power generation due to the zero voltage.

To overcome such a trouble as described above, the power control system 1 of the present embodiment operates in the following manner.

Figure 7:
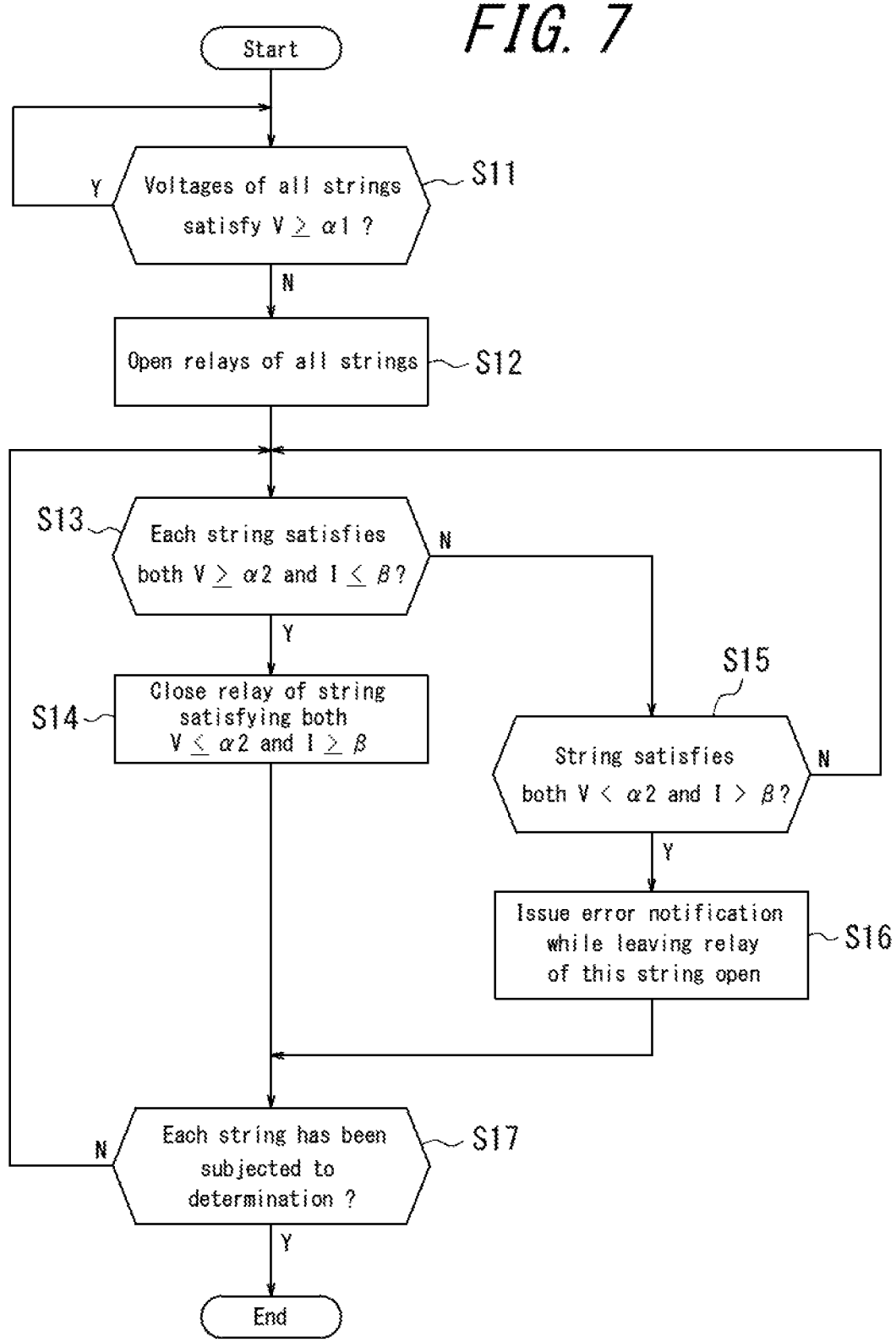
FIG. 7 is a flowchart illustrating an example of an operation of the power control apparatus according to one embodiment.

FIG. 7 is a flowchart illustrating an operation of the power control apparatus 5 of the present embodiment.

At the start of the operation illustrated in FIG. 7, the controller 10 is assumed to have closed all of the switches 40A to 40C for a normal operation of the power control system 1.

When the operation illustrated in FIG. 7 starts, the power control system 1 starts operating, and the solar cell strings 20A to 20C start the power generation. For the start of the operation, the power control apparatus 5 may control such that the power control system 1 starts operating when the voltage values respectively detected by the voltage sensors 44A to 44C exceed a predetermined activation voltage.

When the power control system 1 starts operating, the controller 10 determines whether voltage values V of the power generated by the solar cell strings 20A to 20C are each equal to or greater than a first threshold $\alpha 1$ (step S11). Here, the first threshold $\alpha 1$ is a predetermined appropriate value which, when compared with voltage values of the power generated by the solar cell strings 20A to 20C, allows the controller 10 to determine whether the power control system 1 should continue to operate. The first threshold $\alpha 1$ is set to a low voltage to allow a determination that one of the voltage values below the first threshold $\alpha 1$ means that the transformer having such a voltage value and transforming the power generated by the solar cell string is having a trouble. When at step S11 the voltage values V of the power generated by the solar cell strings 20A to 20C are each equal to or greater than the first threshold $\alpha 1$, the controller 10 makes the power control system 1 continue to operate.

Figure 8A:
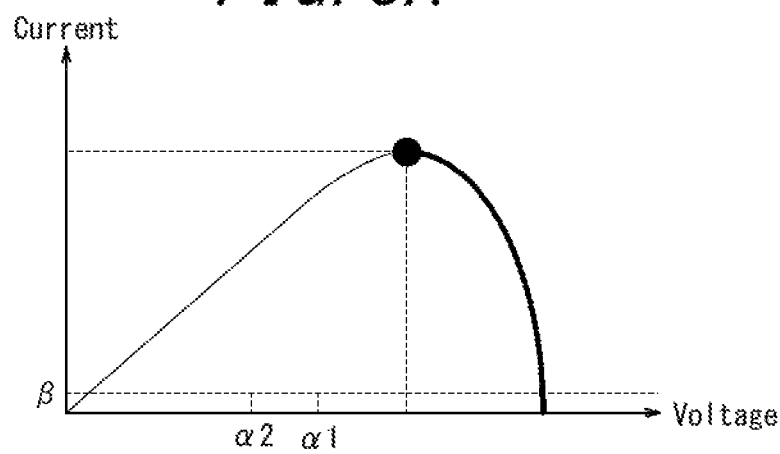
FIGS. 8A to 8C are graphs illustrating power control according to one embodiment.
Figure 8B:
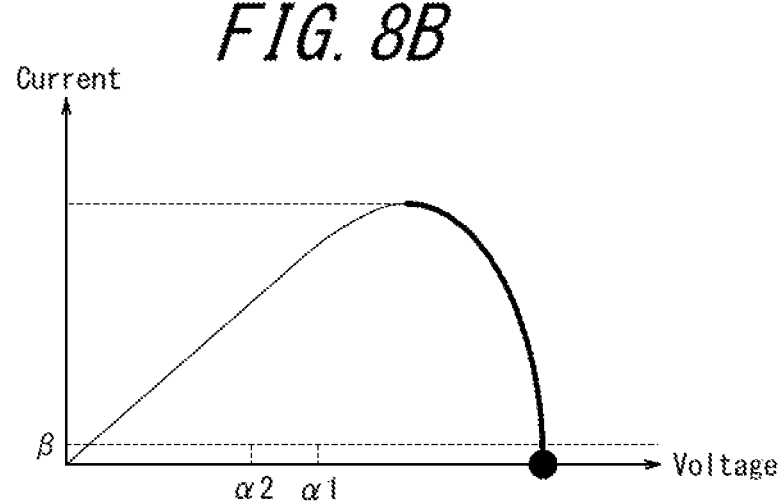
Figure 8C:
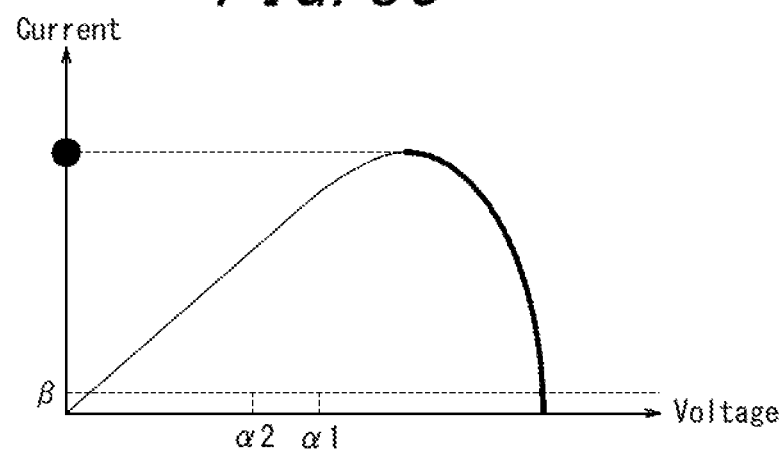

FIGS. 8A to 8C are graphs each illustrating the current value and the voltage value detected by one of the current sensors 42A to 42C and one of the voltage sensors 44A to 44C. Components and meanings of the graphs of FIGS. 8A to 8C are similar to those of FIGS. 4A to 4C.

As illustrated in FIG. 8A, when the transformers 12A to 12C corresponding to the solar cell strings 20A to 20C respectively are operating normally, the voltage values detected by the voltage sensors 44A to 44C are each equal to or greater than the first threshold $\alpha 1$. In this case, the controller 10 may determine that the transformers 12A to 12C are transforming the power generated by the solar cell strings 20A to 20C respectively by appropriately performing the MDPT operation.

On the other hand, when at step S11 the voltage value V of the power generated by one of the solar cell strings 20A to 20C falls below the first threshold $\alpha 1$, the controller 10 opens the switches 40A to 40C of all of the transformers 12A to 12C (step S12). Accordingly, the power generated by the solar cell strings other than the power generated by the solar cell string corresponding to the transformer in which such a low voltage is detected is prevented from flowing back to this transformer. In this way, the present embodiment prevents a flow of large current to the transformer having a trouble and the generation of heat.

As described above, when the controller 10 of the present embodiment determines that one of the diodes 34A to 34C has failed to prevent the reverse flow of the power output from a corresponding one of the transformers 12A to 12C, the controller 10 opens the switches 40A to 40C of all of the transformers 12A to 12C. Alternatively, when in one of the transformers 12A to 12C the voltage sensor 44 detects a voltage lower than the first threshold $\alpha 1$, the controller 10 may determine that the diodes 34 of the one of the transformers 12A to 12C has failed to prevent the reverse flow of the power to be output from the one of the transformers 12A to 12C.

After opening all of the switches 40A to 40C at step S12, the controller 10 determines whether the transformers 12A to 12C satisfy a next condition (step S13). That is, the controller 10 determines at step S13 whether the voltage values V detected by the voltage sensors 44A to 44C are equal to or greater than a second threshold $\alpha 2$ and, simultaneously, whether current values I detected by the current sensors 42A to 42C are equal to or smaller than a third threshold β.

When the transformers 12A to 12C have no troubles after the switches 40A to 40C are opened at step S12, certain voltages and substantially zero current should be detected in the transformers 12A to 12C as illustrated in FIG. 8B. To enable a determination whether the transformers 12A to 12C are operating normally, the second threshold α2 of the voltage is a predetermined appropriate value that ensures the applicability of restart. As illustrated in FIGS. 8A to 8C, the second threshold α2 may be smaller than the first threshold α1. Also, the third threshold β of the current is a predetermined appropriate value that allows a determination that substantially no current is being generated. As illustrated in FIGS. 8A to 8C, the third threshold β may be close to zero.

When the controller 10 determines at step S13 that the above condition is satisfied, one of the transformers 12A to 12C having the diode 34 that has failed is believed to be capable of appropriately transforming the power generated by its corresponding solar cell string 20. In this case, the controller 10 controls to close the switch 40 of the one of the transformers 12A to 12C (step S14). Consequently, the transformers 12 other than the one of the transformers 12A to 12C may continue to transform the power generated by their corresponding solar cell strings 20.

In the present embodiment, as described above, the controller 10 may control to close the switches 40 of the transformers 12 other than the transformer 12 having the diode 34 that is determined as having failed to prevent the reverse flow of the power. Alternatively, the controller 10 may first open the switches 40 of all of the transformers 12A to 12C and then, when in one of the transformers 12A to 12C the voltage value equal to or greater than the second threshold α2 is detected by its corresponding voltage sensor 44 and, simultaneously, the current value equal to or smaller than the third threshold β is detected by its corresponding current sensor 42, close the switch 40 of the one of the transformers 12A to 12C.

On the other hand, when the condition described above is not satisfied at step S13, the controller 10 then determines whether the transformers 12A to 12C satisfy a next condition (step S15). That is, the controller 10 determines at step S15 whether the voltage values V detected by the voltage sensors 44A to 44C are below the second threshold α2 and, simultaneously, the current values I detected by the current sensors 42A to 42C exceed the third threshold β.

After the switches 40A to 40C are opened at step S12, when one of the transformers 12A to 12C has a trouble, the zero voltage and the maximum current should be detected in the one of the transformers 12A to 12C as illustrated in FIG. 8C. As such, the second threshold α2 of the voltage and the third threshold β of the current are predetermined to allow the identification of a transformer having a trouble.

When the controller 10 determines at step S15 that the condition described above is satisfied, the one of the transformers 12A to 12C is believed to be unable to appropriately transform the power generated by its corresponding solar cell string 20. In this case, therefore, the controller 10 controls to leave the switch 40 of the one of the transformers 12A to 12C open (step S16).

At step S16, also, to inform the user that the one of the transformers 12A to 12C corresponding to the switch 40 being open is having a trouble, the controller 10 may issue error notification, as necessary. Here, the error notification may be an error indication specifying the one of the transformers 12A to 12C in a display of the power control apparatus 5 or the like, a buzzer sound generated alone or in synchronization with the error indication, or error information sent to a predetermined unit or the like via a network.

On the other hand, when the controller 10 determines at step S15 that the condition described above is not satisfied, the controller 10 returns to step S13. When the condition of step S15 described above is not satisfied, that is, when the condition in which the current I exceeds the third threshold β and, simultaneously, the voltage V is below the second threshold α2 is not satisfied, the solar cell string may not be able to generate power due to a sudden change in the sunlight or cloudy weather. In this case, the voltages V is continuously monitored and, when the condition at step S13 is satisfied, the transformer 12 satisfying the condition at step S13 may be determined as properly functioning.

In the present embodiment, as described above, the controller 10 may first open the switches 40A to 40C of all of the transformers 12A to 12C and then, when in one of the transformers 12A to 12C the voltage value below the second threshold α2 is detected by a corresponding voltage sensor 44 and, simultaneously, the current value exceeding the third threshold β is detected by a corresponding current sensor 42, leave the switch 40 of the one of the transformers 12A to 12C open.

The above procedures from step S13 to step S16 are performed to each of the transformers 12A to 12C of the solar cell strings 20A to 20C. Therefore, when at step S17 all of the transformers 12A to 12C of the solar cell strings 20A to 20C are determined as operating normally, the power control apparatus 5 ends the operation of the present embodiment. On the other hand, when at step S17 there still is one or more transformers yet to be determined whether operating normally, the controller 10 returns to step S13.

Figure 9:
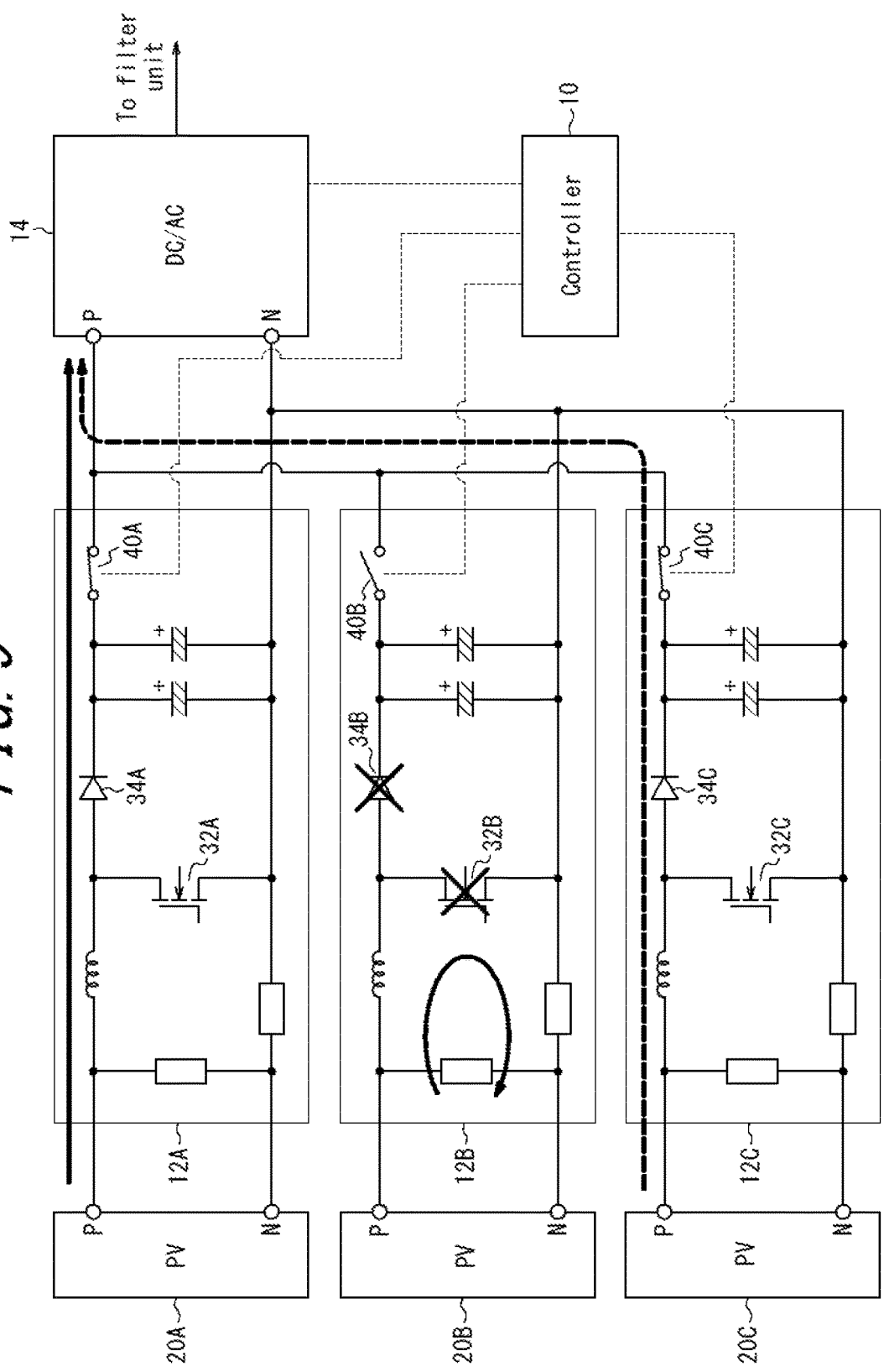
FIG. 9 is a diagram illustrating the power control according to one embodiment.

FIG. 9 is a diagram illustrating an operation of the power control system 1 of the present embodiment performed when a component of the power control apparatus 5 has a trouble.

FIG. 9 illustrates a condition similar to that described with reference to FIG. 5, that is, the condition in which both the switching element 32B and the diode 34B of the transformer 12B have troubles. In the present embodiment, performing the operation described with reference to FIG. 7 leaves the switch 40B open in the transformer 12B alone that includes the diode 34B having a trouble, while closing the switches 40A and 40C of the transformers 12A and 12C having no trouble. As illustrated in FIG. 9, the transformer 12B that includes the diode 34B having a trouble cannot transform the power generated by the solar cell string 20B. As illustrated in FIG. 9, however, the transformers 12A and 12C having no trouble are capable of appropriately transforming the power generated by the solar cell strings 20A and 20B.

Figure 10A:
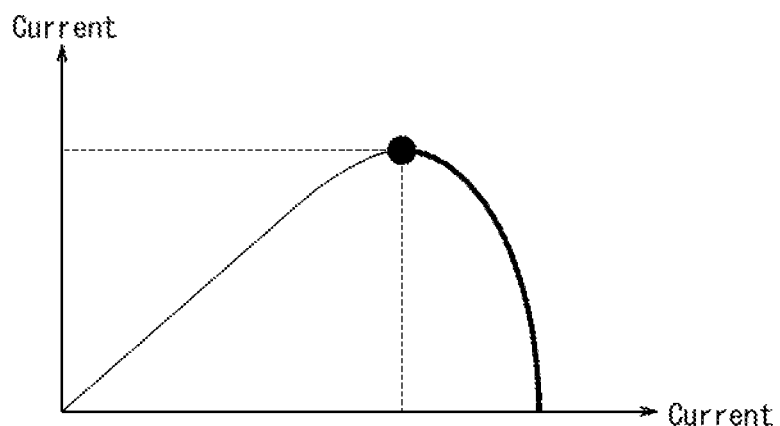
FIGS. 10A to 10C are graphs illustrating the power control according to one embodiment.
Figure 10B:
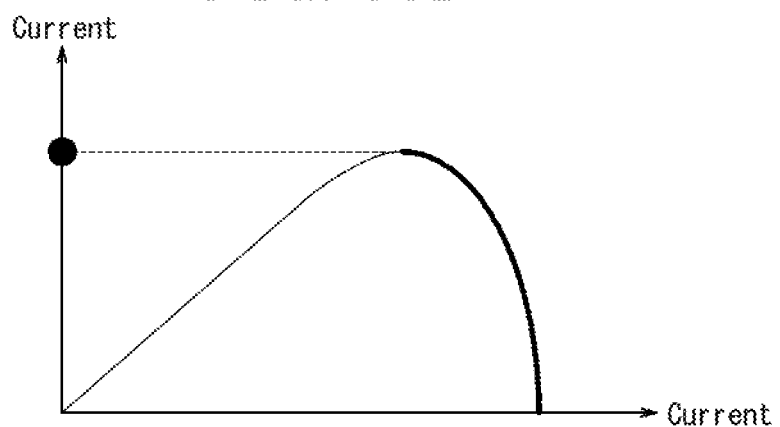
Figure 10C:
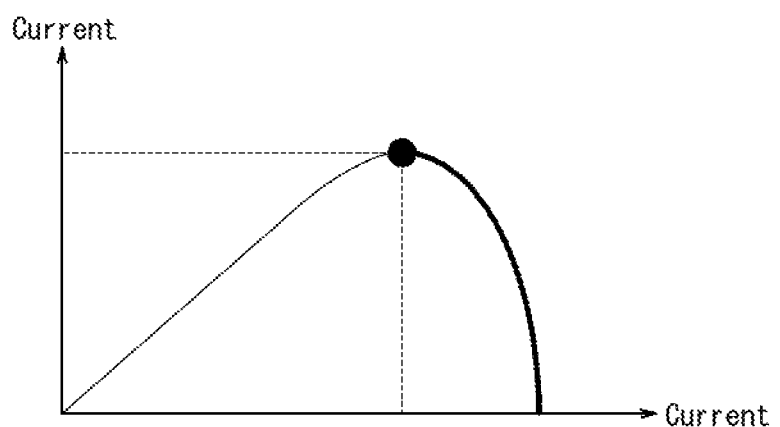

FIG. 10A is a graph illustrating the current value and the voltage value respectively detected by the current sensor 42A and the voltage sensor 44A. FIG. 10B is a graph illustrating the current value and the voltage value respectively detected by the current sensor 42B and the voltage sensor 44B. FIG. 10C is a graph illustrating the current value and the voltage value respectively detected by the current sensor 42C and the voltage sensor 44C. Components and meanings of the graphs of FIGS. 10A to 10C are similar to those of FIGS. 4A to 4C and FIGS. 6A to 6C.

As illustrated in FIG. 10B, when the diode 34B illustrated in FIG. 9 fails to appropriately function, the power flows in the short-circuit in the transformer 12B, and the zero voltage and the maximum current are detected in the transformer 12B. Therefore, the transformer 12B is unable to appropriately transform the power generated by the solar cell string 20B. As illustrated in FIGS. 10A and 10B, on the other hand, when the transformer 12B fails to appropriately function, the transformers 12A and 12C having no trouble may transform the power generated by the solar cell strings 20A and 20C by performing the MPPT operation. In FIG. 9, the transformer 12B alone has a trouble, and the power generated by the solar cell strings 20A and 20C may be appropriately used.

In the present embodiment, as described above, the power control apparatus 5 for controlling the power generated by the solar cell strings 20A to 20C may overcome a trouble of a component such as the diode 34 in the power control apparatus 5.

As described above, when the diode, which is provided for the purpose of preventing the reverse flow of the power in a circuit of the DC/DC converter, is damaged causing the short-circuit, all of the solar cell strings cannot generate power and, further, all of the currents of the power generated by the solar cell strings flow to one input circuit, causing the heat generation and the like. According to the disclosure, however, the switch, which may be the power relay or the like, is provided at an output interface of each of the DC/DC converters. Therefore, when the trouble as described above occurs, all of the switches are immediately opened, and the trouble may be overcome.

According to the disclosure, further, all of the switches are opened to disconnect all of the solar cell strings from the transformers, and the current sensor provided in the circuit is used to identify the transformer in which the large current has flown. When the diode for preventing the reverse flow of the power and the switching element are damaged, the zero voltage and the short-circuit current are detected in one of the transformers that includes the damaged diode and switching element. When the zero voltage and the short-circuit current are detected, the power control apparatus 5 externally issues the error notification and, simultaneously, controls such that the switch of the one of the transformers remains open. The transformers other than the one of the transformers are maintained to operate normally, such that the user may make the most of the power generated by the solar cell strings other than the solar cell string corresponding to the one of the transformers, until recovery of the one of the transformers is made by a maintenance personnel. According to the disclosure, as described above, since the DC/DC converter alone having a trouble is stopped operating, the user may make the most of the power generated by solar cell strings other than the solar cell string corresponding to the DC/DC converter having a trouble, until the DC/DC converter is fixed.

In this way, the disclosure may significantly improve reliability and maintenance characteristics of the power control system having a plurality of solar cell strings connected.

Although the disclosure herein has been described based on the figures and the embodiment, it is to be understood that those who are ordinarily skilled in the art may easily implement various modifications and changes based on the disclosure herein. Therefore, such modifications and changes are included in the scope of the disclosure herein. For example, functions and the like included in each functional unit, means, and step may be rearranged without logical inconsistency, so as to combine a plurality of functional units or steps together or to separate them. Also, the disclosure herein should not be construed as strictly limited to the embodiment set forth above but may be substantialized by appropriately combining features of the embodiment.

In the above embodiment, there are three solar cell strings each having a corresponding transformer. However, any number of the solar cell strings and transformers may be provided in the power control system and the power control apparatus of the disclosure.

Although the power control apparatus and the power control system that includes the power control apparatus are described above, the disclosure may also be substantialized by a power control method of the power control system as described above.

In this case, the power control method includes:
determination step of determining whether a diode 34 of one of the transformers 12 has failed to prevent the reverse flow of the power to be output from the one of the transformers 12;
opening step of, when in the determination step the diode 34 is determined as having failed to prevent the reverse flow of the power to be output from the one of the transformer 12, opening the switches 40 of all of the transformers 12; and then
closing step of closing the switches 40 of the transformers 12 other than the switch 40 of the one of the transformers 12 that includes the diode 34 determined as having failed to prevent the reverse flow of the power.

The power control apparatus for controlling the power generated by a plurality of solar cell strings, the power control system, and the power control method according to the embodiment of the disclosure may overcome the trouble occurs to a component of the power control apparatus.

Many aspects of the disclosure herein may be represented by a series of operations executed by a computer system or other hardware those are capable of executing a program instruction. The computer system or the other hardware include, for example, a general-purpose computer, a PC (personal computer), a special purpose computer, a workstation, PCS (Personal Communications System; a personal mobile communication system), an electronic notepad, a laptop computer, and other programmable data processing apparatuses. Note that in the embodiment of the disclosure the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a controller, a microcontroller, an electronic apparatus, and other apparatuses designed to be capable of executing the functions described herein, and/or a combination thereof. The embodiment presented herein is implemented by, for example, hardware, software, firmware, middleware, a microcode, or any combination thereof.

Also, the machine-readable non-transitory storage medium used herein may be constituted by using a solid state memory or a tangible carrier (medium) readable by the computer such as a magnetic disk and an optical disk. This medium stores an appropriate set of computer instructions such as program modules and a data structure those for making the processor to execute the technique disclosed herein. The computer-readable medium includes an electric connection with at least one wiring, a magnetic disk storage media, other magnetic and optical storage devices such as a CD (Compact Disk), a DVD® (Digital Versatile Disc; DVD is a registered trademark in Japan, other countries, or both), and a Blu-ray disc, a portable computer disk, RAM (Random Access Memory), ROM (Read-Only Memory), a ROM such as an EPROM, an EEPROM, or a flash memory that is rewritable and programmable, other tangible storage media capable of storing information, or any combination thereof. The memory may be provided inside and/or outside the processor/processing unit. Here, the term "memory" means all types of a long-term memory, a short-term memory, a volatile memory, a non-volatile memory, and other memories. A type of the memory, the number of memories, and a type of the medium to store the information are not limited.

REFERENCE SIGNS LIST 1 power control system
5 power control apparatus
10 controller
12 transformer
14 inverter
16 filter unit
20 solar cell string
30 coil
32 switching element
34 diode
36, 38 capacitor
40 switch
42 current sensor
44 voltage sensor
50 load
60 power grid

The invention claimed is:

1. A power control apparatus comprising:
a plurality of transformers each configured to transform power generated by a corresponding one of a plurality of solar cell strings and outputting power transformed to an inverter; and
a controller configured to control the plurality of transformers,
wherein the plurality of transformers include respective diodes configured to prevent a reverse flow of power to be output from the plurality of transformers, and a switch configured to open or close a connection between the solar cell string and the inverter, and
wherein, when a diode of one of the plurality of transformers fails to prevent the reverse flow of the power to be output from the one of the plurality of transformers, the controller opens the switches of all of the plurality of transformers and then closes switches other than the switch of the one of the plurality of transformers.

2. The power control apparatus according to claim 1,
wherein the plurality of transformers each include a voltage sensor configured to detect a voltage value of power generated by one of the plurality of solar cells that is coupled to the transformer itself, and
wherein, when one of the plurality of transformers has a voltage value below a first threshold detected by the voltage sensor, the controller determines that a diode of the one of the plurality of transformers has failed to prevent the reverse flow of the power to be output from the one of the plurality of transformers.

3. The power control apparatus according to claim 2,
wherein the plurality of transformers each include a current sensor configured to detect a current value of power generated by one of the plurality of solar cells that is coupled to the transformer itself, and
wherein the controller opens switches of all of the plurality of transformers and then closes a switch of a transformer in which the voltage value detected by the voltage sensor is equal to or greater than a second threshold and, simultaneously, the current value detected by the current sensor is equal to or smaller than a third threshold.

4. The power control apparatus according to claim 2,
wherein the plurality of transformers each include a current sensor configured to detect a current value of power generated by one of the plurality of solar cells that is coupled to the transformer itself, and
wherein the controller opens switches of all of the plurality of transformers and then leaves a switch open, the switch corresponding to a transformer in which the voltage value detected by the voltage sensor is below a second threshold and, simultaneously, the current value detected by the current sensor exceeds a third threshold.

5. A power control system including a plurality of solar cell strings and a power control apparatus,
wherein the power control apparatus includes:
a plurality of transformers each configured to transform power generated by a corresponding one of a plurality of solar cell strings and outputting power transformed to an inverter, and
a controller configured to control the plurality of transformers, wherein the plurality of transformers each include:
a diode configured to prevent a reverse flow of power to be output from a corresponding one of the plurality of transformers, and
a switch configured to open or close a connection between the solar cell string and the inverter, and
wherein, when a diode of one of the plurality of transformers fails to prevent the reverse flow of the power to be output from the one of the plurality of transformers, the controller opens the switches of all of the plurality of transformers and then closes switches other than the switch of the one of the plurality of transformers.

6. The power control system according to claim 5,
wherein the plurality of transformers each include a voltage sensor configured to detect a voltage value of power generated by one of the plurality of solar cells that is coupled to the transformer itself, and
wherein, when one of the plurality of transformers has a voltage value below a first threshold detected by the voltage sensor, the controller determines that the diode of the one of the plurality of transformers has failed to prevent the reverse flow of the power to be output from the one of the plurality of transformers.

7. The power control system according to claim 6,
wherein the plurality of transformers each include a current sensor configured to detect a current value of power generated by one of the plurality of solar cells that is coupled to the transformer itself, and
wherein the controller opens switches of all of the plurality of transformers and then closes a switch of a transformer in which the voltage value detected by the voltage sensor is equal to or greater than a second threshold and, simultaneously, the current value detected by the current sensor is equal to or smaller than a third threshold.

8. The power control system according to claim 6,
wherein the plurality of transformers each include a current sensor configured to detect a current value of power generated by one of the plurality of solar cells that is coupled to the transformer itself, and wherein the controller opens switches of all of the plurality of transformers and then leaves a switch open, the switch corresponding to a transformer in which the voltage value detected by the voltage sensor is below a second threshold and, simultaneously, the current value detected by the current sensor exceeds a third threshold.

9. A power control method of a power control apparatus having a plurality of transformers each configured to transform power generated by a corresponding one of a plurality of solar cell strings and outputting power transformed to an inverter, wherein the plurality of transformers each include a diode configured to prevent a reverse flow of power to be output from a corresponding one of the plurality of transformers, and a switch configured to open or close a connection between the solar cell string and the inverter, and wherein the power control method includes:

a determination step of determining whether a diode of one of the plurality of transformers has failed to prevent a reverse flow of power to be output from the one of the plurality of transformers;

an opening step of, when in the determination step the diode is determined as having failed to prevent the reverse flow of the power to be output from the one of the plurality of transformers, opening the switches of all of the plurality of transformers; and a closing step of closing switches other than the switch of the one of the plurality of transformers.

10. The power control method according to claim 9, wherein the plurality of transformers each include a voltage sensor configured to detect a voltage value of power generated by one of the plurality of solar cells that is coupled to the transformer itself, and wherein, when in the determination step a voltage value below a first threshold is detected by a voltage sensor of one of the plurality of transformers, the diode of the one of the plurality of transformers is determined as having failed to prevent the reverse flow of the power to be output from the one of the plurality of transformers.

11. The power control method according to claim 10, wherein the plurality of transformers each include a current sensor configured to detect a current value of power generated by one of the plurality of solar cells that is coupled to the transformer itself, and wherein, after the opening step of opening the switches of all of the plurality of transformers, the closing step closes a switch of a transformer in which the voltage value detected by the voltage sensor is equal to or greater than a second threshold and, simultaneously, the current value detected by the current sensor is equal to or smaller than a third threshold.

12. The power control method according to claim 10, wherein the plurality of transformers each include a current sensor configured to detect a current value of power generated by one of the plurality of solar cells that is coupled to the transformer itself, and wherein, after the opening step of opening the switches of all of the plurality of transformers, a switch is left open, the switch corresponding to a transformer in which the voltage value detected by the voltage sensor is below a second threshold and, simultaneously, the current value detected by the current sensor exceeds a third threshold.

* * * * *